US006933969B1

(12) United States Patent
Noguchi et al.

(10) Patent No.: US 6,933,969 B1
(45) Date of Patent: Aug. 23, 2005

(54) IMAGE CAPTURING APPARATUS

(75) Inventors: Fujio Noguchi, Tokyo (JP); Shigeki Ishizuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/358,529

(22) Filed: Jul. 22, 1999

(30) Foreign Application Priority Data

Jul. 27, 1998 (JP) .................................. 10-211530

(51) Int. Cl.[7] .................. H04N 5/225; H04N 5/76; H04N 5/91
(52) U.S. Cl. ................. 348/220.1; 348/231.9; 386/117; 386/120
(58) Field of Search ............... 340/995, 701, 340/213, 208, 937; 348/220.1, 231.9; 358/906, 358/909.1; 386/117, 120, 121; 701/200, 701/201, 207, 208, 213; 336/117, 120.121

(56) References Cited

U.S. PATENT DOCUMENTS

| 5,200,863 | A | * | 4/1993 | Orii | 386/118 |
| 5,648,816 | A | * | 7/1997 | Wakui | 348/231.9 |
| 6,128,447 | A | * | 10/2000 | Nelson et al. | 396/429 |
| 6,184,922 | B1 | * | 2/2001 | Saito et al. | 348/635 |
| 6,297,748 | B1 | * | 10/2001 | Lappenbusch et al. | 340/905 |
| 2001/0014202 | A1 | * | 8/2001 | Honda et al. | 386/46 |

* cited by examiner

*Primary Examiner*—Tuan Ho
*Assistant Examiner*—Brian Genco
(74) *Attorney, Agent, or Firm*—Frommer Lawrence & Haug LLP; William S. Frommner

(57) ABSTRACT

An image capturing apparatus uses a plurality of recording media. The image capturing apparatus includes a detection unit for detecting the loading of a first recording medium, and a control unit for switching the operation mode of the image capturing apparatus in accordance with a detection result obtained by the detection unit.

3 Claims, 10 Drawing Sheets

IMAGE CAPTURING APPARATUS

BACKGROUND OF THE INVENTION

1. Field of the Invention

The present invention relates to image capturing apparatuses, and in particular, to a video camera that records captured pictures in an integrated circuit (IC) card.

2. Description of the Related Art

Conventional image capturing apparatuses such as video cameras record captured moving pictures as image-capturing results by recording video signals on a magnetic tape. In a type of image capturing apparatus among the apparatuses, captured still pictures are recorded instead of captured moving pictures by operating a changeover switch, or the like.

It is possible that the convenience of the image capturing apparatus is enhanced by switching the recording mode of the image capturing apparatus between a mode for recording captured moving pictures and a mode for recording captured still pictures.

SUMMARY OF THE INVENTION

Accordingly, it is an object of the present invention to provide an image capturing apparatus for easily and securely switching the mode of the image capturing apparatus between a mode for recording captured moving pictures and a mode for recording captured still pictures.

To this end, according to an aspect of the present invention, the foregoing object is achieved through provision of an image capturing apparatus using a plurality of recording media. The image capturing apparatus includes a detection unit for detecting the loading of a first recording medium, and a control unit for switching the operation mode of the image capturing apparatus in accordance with a detection result obtained by the detection unit.

According to another aspect of the present invention, the foregoing object is achieved through provision of an image capturing apparatus including a first operation unit for recording an image-capturing signal on a first recording medium, a second operation unit for recording an image-capturing signal on a second recording medium, a detection unit for detecting the loading of the first recording medium, and a control unit for invalidating the operation of the second operation unit when detecting the loading of the first recording medium by using the detection unit.

According to a further aspect of the present invention, the foregoing object is achieved through provision of an image capturing apparatus including a control unit for switching the mode of the image capturing apparatus between a first operation mode for recording an image-capturing signal on a first recording medium and a second operation mode for recording an image-capturing signal on a second recording medium, and a detection unit for detecting the loading of the first recording medium. When the control unit uses the detection unit to detect the loading of the first recording medium, the control unit switches the operation mode of the image capturing apparatus to the first operation mode.

According to a still further aspect of the present invention, the foregoing object is achieved through provision of an image capturing apparatus including a control unit for switching the mode of the image capturing apparatus between a first operation mode for recording an image-capturing signal as a still picture and a second operation mode for recording the signal as a moving picture, and a detection unit for detecting the loading of the first recording medium. When the control unit uses the detection unit to detect the loading of the first recording medium, the control unit switches the operation mode of the image capturing apparatus to the first operation mode.

According to an even further aspect of the present invention, the foregoing object is achieved through provision of an image capturing apparatus including a control unit for switching the mode of the image capturing apparatus between a first operation mode for recording an image-capturing signal as a still picture on a card recording medium and a second operation mode for recording the signal as a moving picture on a tape recording medium, and a detection unit for determining whether the card recording medium is loaded into the image processing apparatus. When the control unit uses the detection unit to detect the loading of the card recording medium, the control unit switches the operation mode of the image capturing apparatus to the first operation mode.

According to yet another aspect of the present invention, the foregoing object is achieved through provision of an image capturing apparatus including a first operation unit for recording an image-capturing signal on a card recording medium, a second operation unit for recording the signal on a tape recording medium, a detection unit for determining whether the card recording medium is loaded into the image capturing apparatus. When the control unit uses the detection unit to detect the loading of the card recording medium, the control unit invalidates the operation of the second operation unit.

According to the present invention, by loading a card recording medium into an image capturing apparatus, the operation mode of the image capturing apparatus can be switched from a moving-picture recording mode to a still-picture recording mode. Therefore, the operation mode of the image capturing apparatus can simply and securely be switched between a mode for recording captured pictures and a mode for recording still pictures.

DESCRIPTION OF THE PREFERRED EMBODIMENTS

The present invention is described below with reference to the attached drawings.

Figure 2:
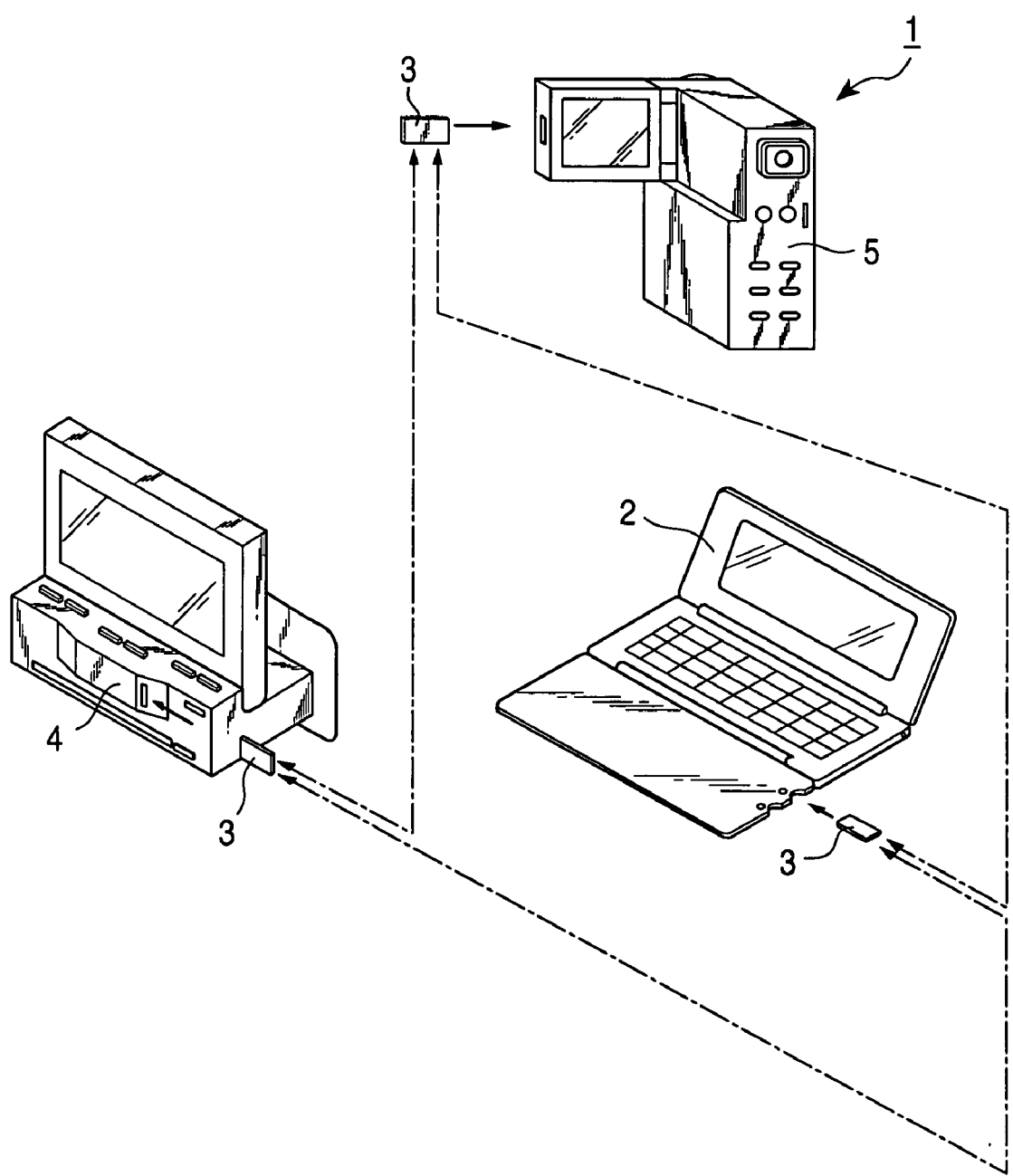
FIG. 2 is a drawing showing a car navigation system according to an embodiment of the present invention.

FIG. 2 shows a car navigation system according to an embodiment of the present invention.

In a car navigation system 1, a route from a starting point to a destination is selected by performing car navigation using, for example, a personal computer 2, and the selected route can be recorded in an IC card 3. In the car navigation system 1, the IC card 3 is loaded into an on-vehicle car navigation apparatus 4, and the car navigation apparatus 4 guides a car driver in accordance with the route recorded in the IC card 3.

According to the car navigation system 1, in the desired spot, the IC card 3 is loaded into the video camera 5, and still pictures are recorded in the IC card 3. The recorded pictures can be recognized by loading the IC card into the car navigation apparatus 4. The recorded pictures can also be recognized by loading the IC card 3 into the personal computer 2. When the car navigation apparatus 4 and the personal computer 2 are used to recognize the still pictures, positional information recorded, together with the recorded pictures, can be utilized.

Figure 3:
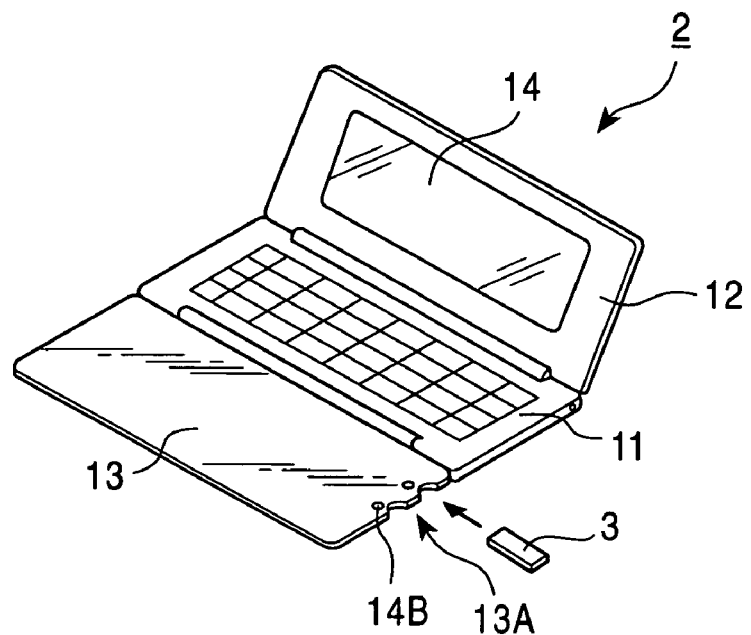
FIG. 3 is a perspective view showing the personal computer shown in FIG. 2.
Figure 4:
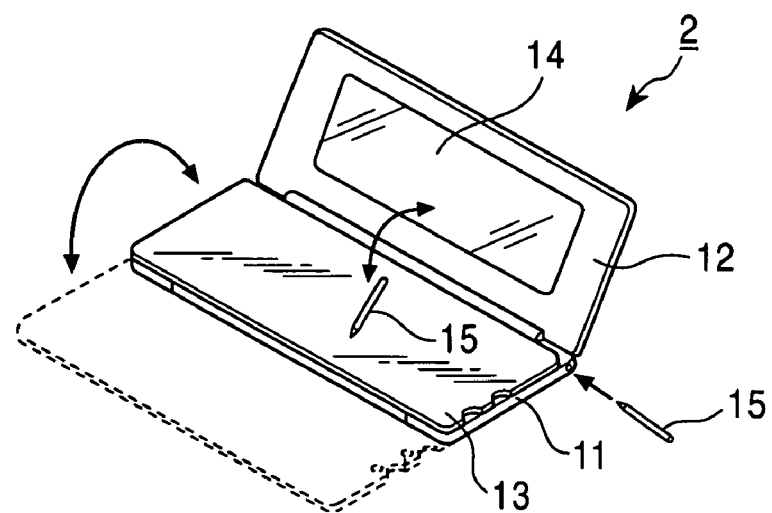
FIG. 4 is a perspective view showing that the tablet of the personal computer shown in FIG. 2 is folded.

FIG. 3 is a perspective view of the personal computer 2, and FIG. 4 is a perspective view showing the condition of the personal computer 2 in which the tablet 3 can be used.

In the personal computer 2, a cover 12 is provided to a body 11 so as to be rotated around the rear rotation axis of the body 11, and a tablet 13 is provided to the body 11 so as to be rotated around the front rotation axis of the body 11. On the inner surface of the cover 12, a liquid display panel 14 is provided, and on the inner surface of the body 11, a keyboard is provided. Accordingly, after the cover 12 is opened from the body 11, and the tablet 13 is folded as indicated by the arrows shown in FIG. 4, the desired application software can be operated by operating the keyboard, and the liquid crystal display panel 14 can be viewed.

In the personal computer 2, a switch that is turned on and off in accordance with the rotation of the tablet 13 is built into the front rotation axis. The tablet 13 can be operated in accordance with the operation of the switch when the tablet 13 is folded so as to cover the keyboard, as shown in FIG. 4. This reduces the entire size of the personal computer 2, and the operation of the tablet 13 having a large area improves the operability of the personal computer 2.

At the right end of the tablet 13, a slot 13A is formed as shown in FIG. 3. The IC card 3 can be loaded into the slot 13A. In the vicinity of the slot 13A, an indicator composed of a light-emitting diode 14B. When the IC card 3 is loaded, the light-emitting diode 14B is activated. While the IC card 3 is being accessed, the light-emitting diode 14B flashes. In one side of the body 11, a stylus 15 as a pointing device for operating the tablet 13 can be received.

Figure 5:
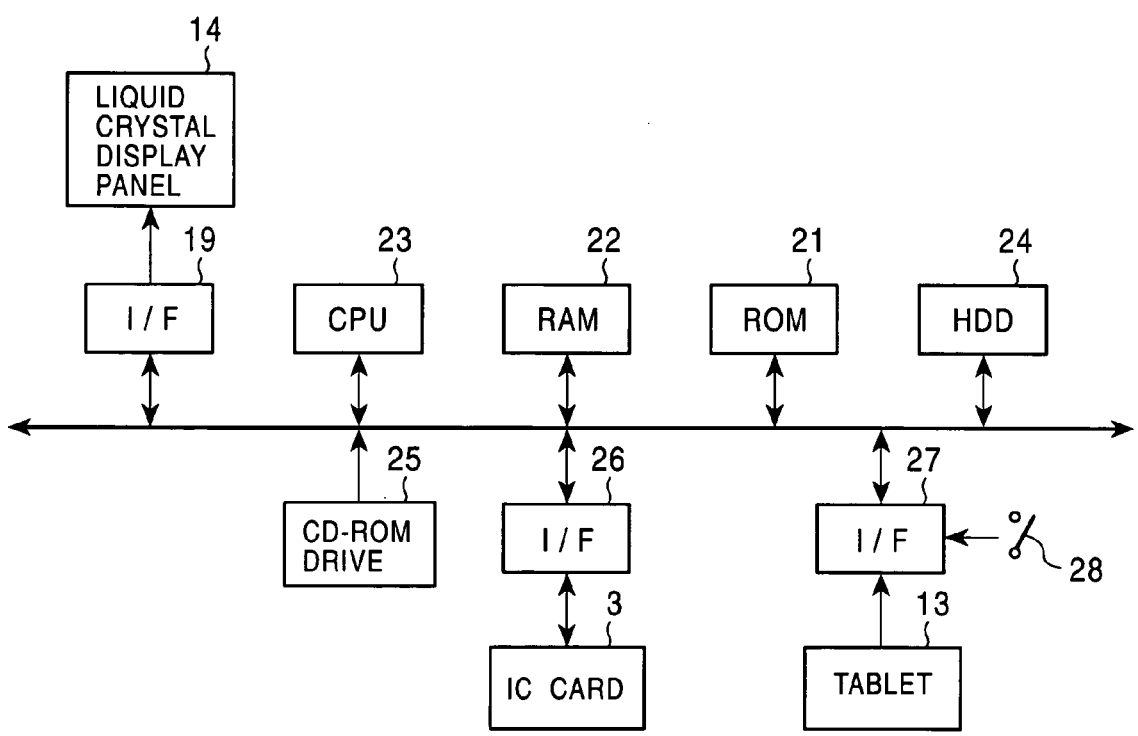
FIG. 5 is a block diagram showing the personal computer shown in FIG. 3.

FIG. 5 is a block diagram of the personal computer 2. The personal computer 2, which is similar to a general personal computer, reserves a work area in a random access memory (RAM) 22 in accordance with data recorded in a read-only memory (ROM) 21, and uses a central processing unit (CPU) 23 to execute a program recorded in a hard disk drive (HDD) 24.

The personal computer 2 uses an interface (I/F) 19 to drive the liquid crystal display panel 14 by executing application software, whereby a display screen is formed. The personal computer 2 accesses a compact-disk read-only memory (CD-ROM) loaded into a CD-ROM drive 25, whereby map information is loaded. The personal computer 2 accesses the IC card 3 via an I/F 26, and displays a cursor, etc., based coordinate information input from the tablet 13 via an I/F 27.

In the personal computer 2, the I/F 27 detects the rotation of the tablet 13 by using a switch 28 built into the front rotation axis of the tablet 13. When the tablet 13 is folded to cover the keyboard, the I/F 27 operates so that coordinate data can be input from the tablet 3. This prevents the personal computer 2 from acquiring the coordinate data when the tablet 13 is opened. Accordingly, if something such as a member touches the tablet 13 when it is opened, no malfunction occurs.

The I/F 26 for the IC card 3 is connected to the IC card 3 via a socket provided in the slot 13A. The I/F 26 monitors the voltage of a predetermined terminal of the socket, and determines whether the IC card 3 is loaded in accordance with a change in the terminal voltage. When the I/F 26 detects the loading of the IC card 3, it accesses the IC card 3, and determines whether the IC card 3 is correctly loaded. When the IC card 3 is correctly loaded, the light-emitting diode 13B glows. In the case where the IC card 3 is accessed by using control of the CPU 23, the light-emitting diode 13B alternatively flashes.

Figure 6:
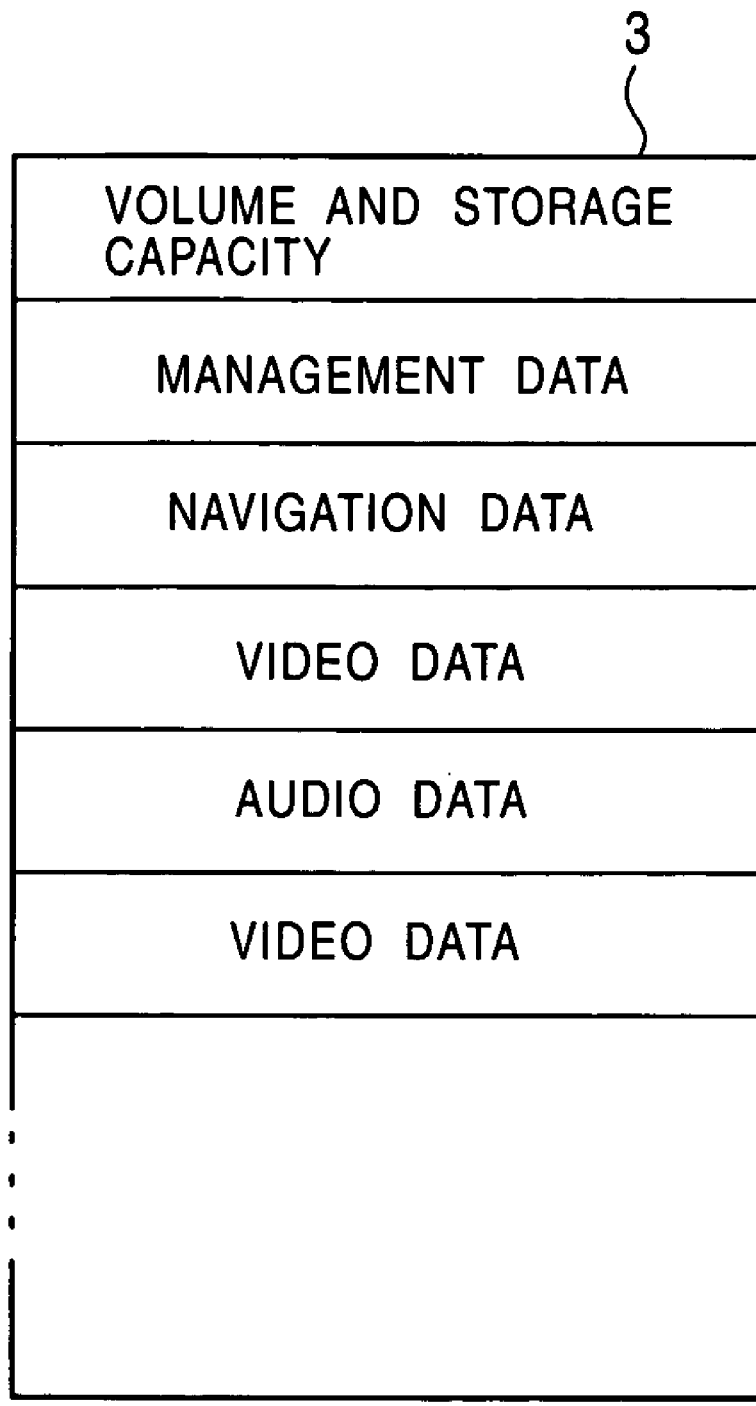
FIG. 6 is an illustration of the format of an IC card.

FIG. 6 shows the memory space of the IC card 3. In the IC card 3, the volume of the IC card 3, the entire recording capacity of the IC card 3, etc., are recorded from the start region of the memory space. Successively, management data are recorded, and in the remaining user region, the files of navigation data, the files of video data, the files of audio data, etc., are recorded. Data managing the user region, such as the names of files recorded in the user region, the date and time of recording, positional information on recording positions, file types (navigation data, video data, audio data, text data, and compression formats), and remaining recording capacity, are recorded as the management data. The management data include correlation information among the files recorded in the user region. The correlation information is set by using a pointer having a predetermined number of bits.

Accordingly, in the case where a file recorded in the user region belongs to a video data type, the IC card 3 detects an image capture place from management data concerning the file. The IC card 3 can find, from correlation information, that the file was recorded in a trip in accordance with navigation data.

When the IC card 3 is loaded, the I/F 26 accesses the IC card 3 in accordance with the application software. The I/F 26 reads, from the IC card 3, the volume of the IC card 3, entire recording capacity, and management data, and notifies the CPU 23 of them. The I/F 26 also accesses the user region in accordance with the application software executed in accordance with the management data. When the user region is updated, the I/F 26 updates the management data under the control of the CPU 23 so as to be adapted for the updating of the user region.

Figure 7:
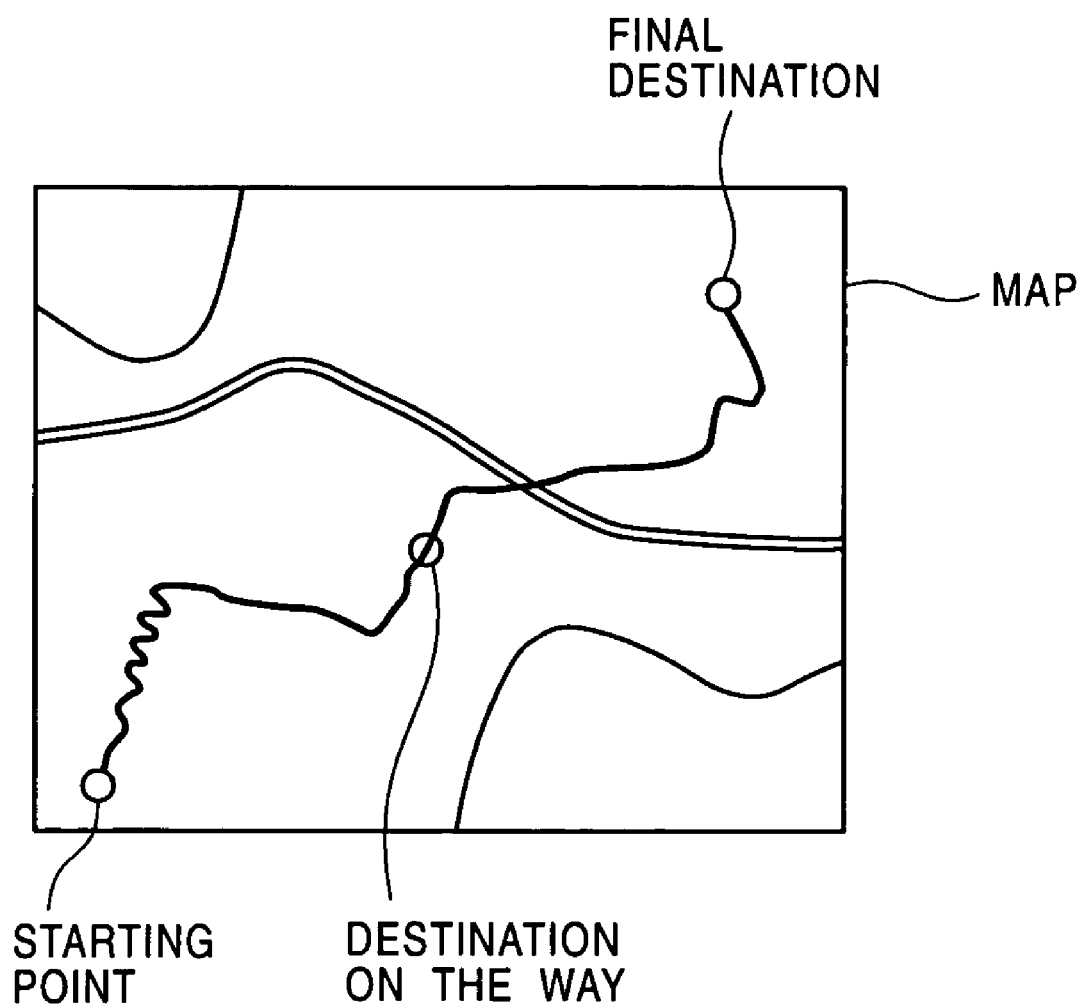
FIG. 7 is an illustration of an image displayed by the personal computer shown in FIG. 3.

FIG. 7 shows a display screen formed by car navigation software in the application software executed as described above. In this car navigation software, the CPU 23 sets, based on a starting point, a final destination, and a destination on the way, which are input from the keyboard and the tablet 13, a route connecting these points on the displayed map. The CPU 23 records the set route data and a travel date as car navigation data in the IC card 3.

Figure 8:
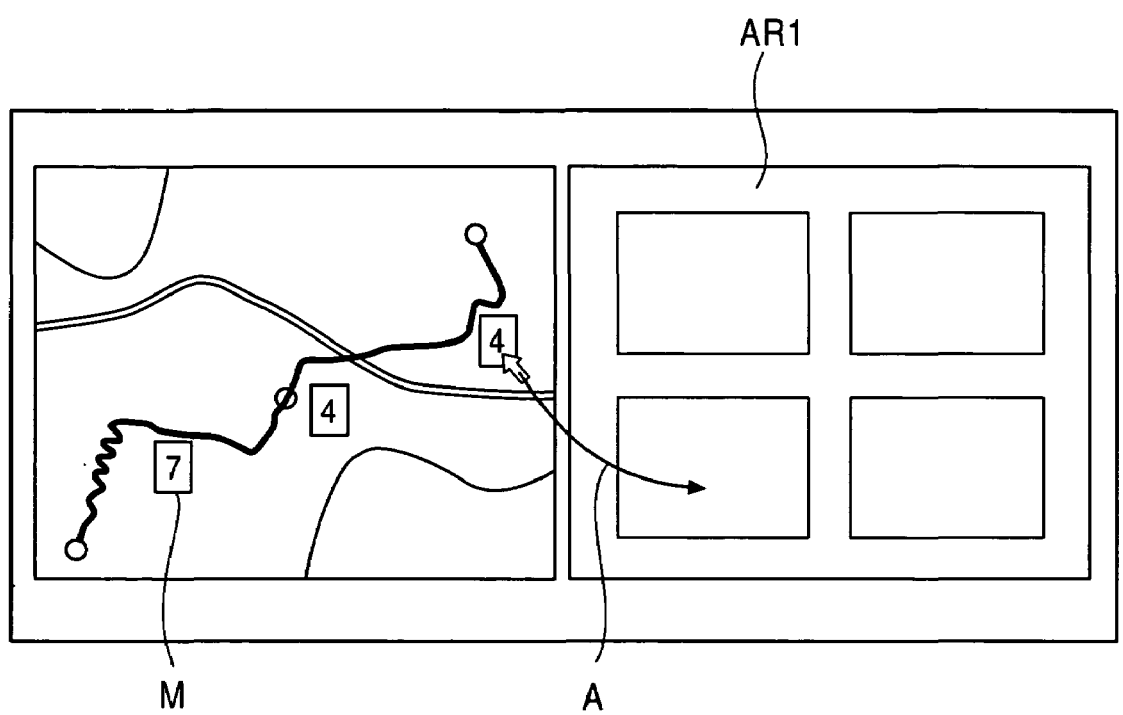
FIG. 8 is an illustration of another image displayed by the personal computer shown in FIG. 3.

FIG. 8 shows a display screen formed by image processing software in association with the car navigation software. In the image processing software, the CPU 23 displays, on the map, the car navigation data recorded in the IC card 3 in accordance with a user operation. In the case where it is found, based on the management data in the IC card 3, that video data correlated with the car navigation data are recorded, the CPU 23 uses the positional information of each file as a reference to display image-capturing positions on the map and a number M (the number of pictures recorded in the IC card 3) of captured pictures at each image-capturing position. The display of the number M of captured pictures is performed such that the number of captured pictures at each image-capturing position is displayed in each rectangular frame looking a photograph.

When a display of the number of captured pictures is dragged into a right display region AR1 by operating the tablet 13, as indicated by the arrow A, the data of the corresponding file are loaded from the IC card 3, and are displayed in the display region AR1. Thus, in the personal computer 2, the image data recorded in the IC card 3 so as to be correlated with the car navigation data, together with the positional information, can be easily recognized. The CPU 23 outputs a still picture displayed as described above from a printer or the like in accordance with a user operation.

Figure 9:
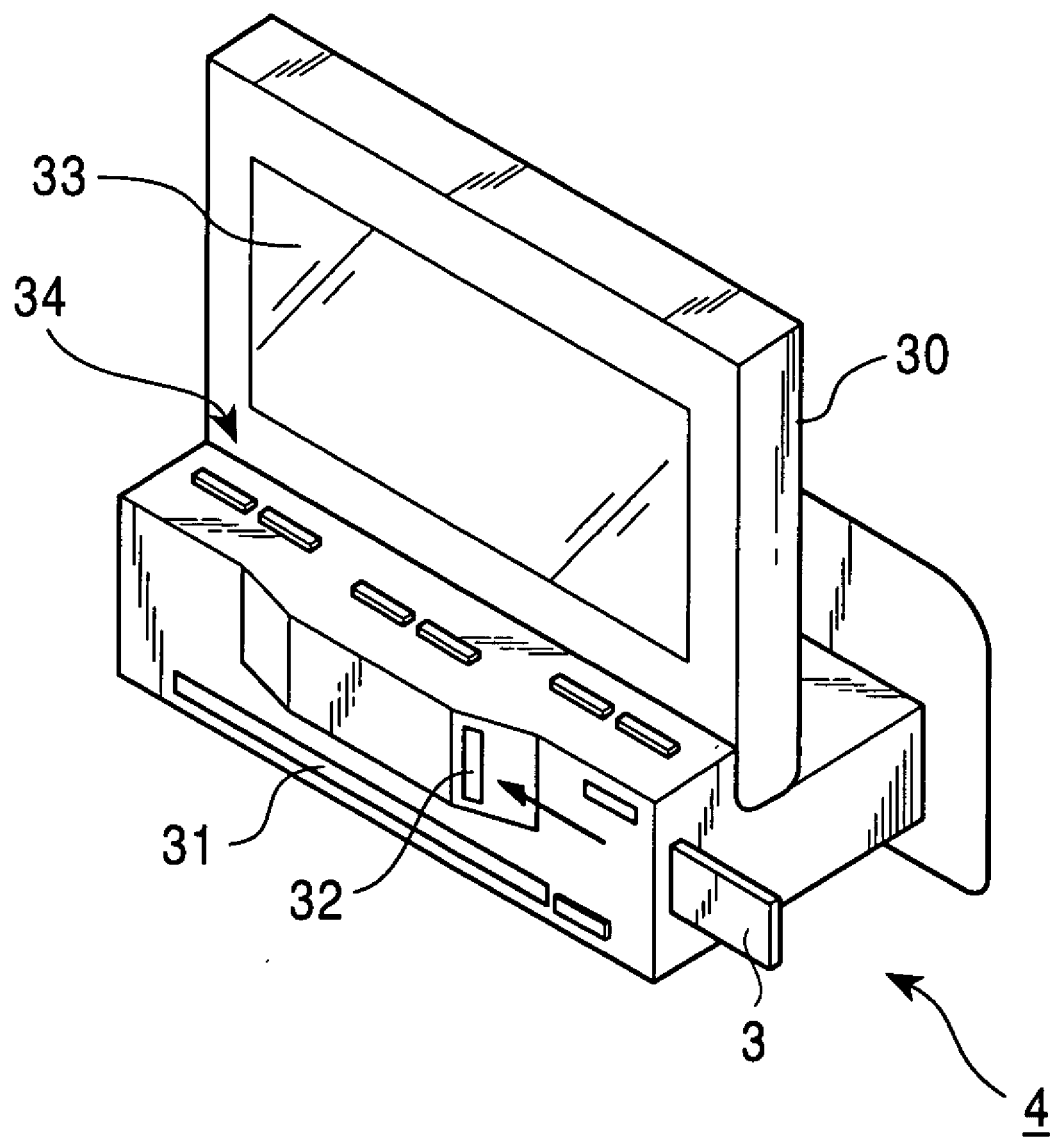
FIG. 9 is a perspective view showing the car navigation system shown in FIG. 2.

FIG. 9 is a perspective view of the car navigation apparatus 4. The car navigation apparatus 4 is provided on, for example, a dashboard for an automobile. When the entire car navigation apparatus 4 is pressed, it is pushed out forward, and a liquid crystal display 30 falls backward. After that, the entire car navigation apparatus 4 is moved backward to be accommodated in the dashboard. When the car navigation apparatus 4 is accommodated in the dashboard, as described above, a press of an exposed portion of the car navigation apparatus 4 pushes out the entire car navigation apparatus 4 forward, and the liquid crystal display 30 rises. After that, the entire car navigation apparatus 4 retreats to become operational, as shown in FIG. 9.

On the front of the car navigation apparatus 4, a long slit 31 is formed, from which a CD and a CD-ROM can be loaded. A rectangular portion of the car navigation apparatus 4 which is above the slit 31 projects, and a side surface of the projecting portion has a slot 32 to which the IC card 3 is loaded. In the car navigation apparatus 4, the liquid crystal display 30 has a liquid crystal display panel 33, and a base for the liquid crystal display 30 has various operating devices 34.

Figure 10:
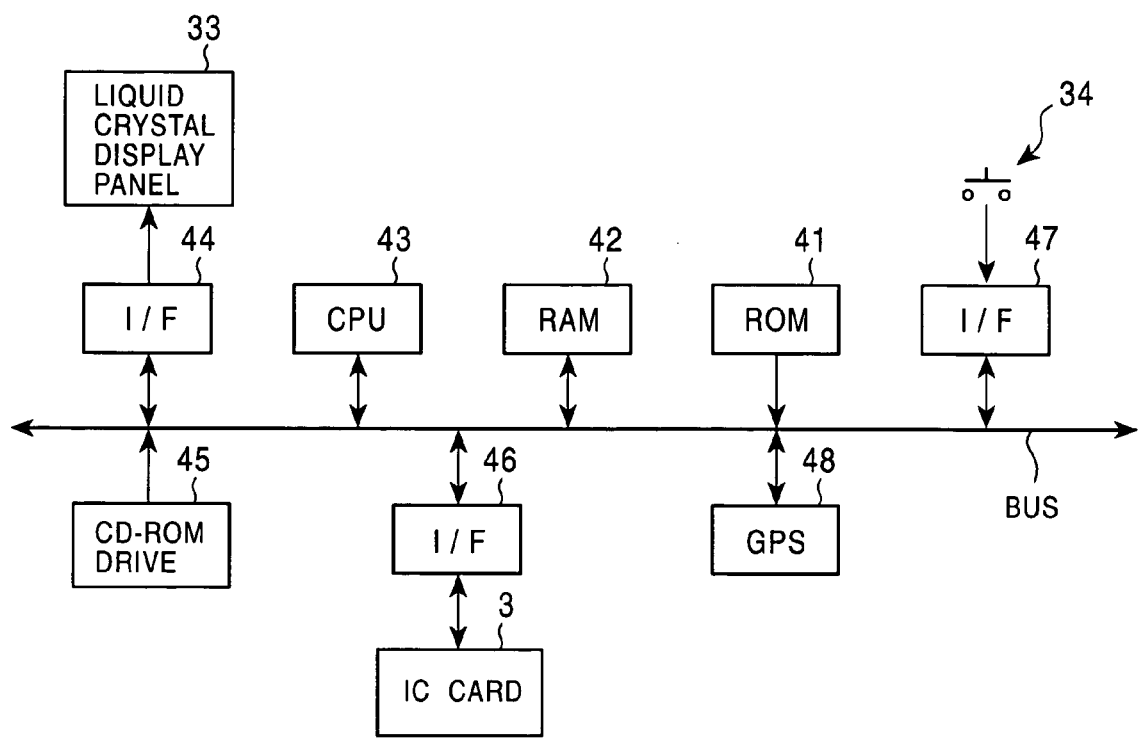
FIG. 10 is a block diagram showing the car navigation system shown in FIG. 9.

FIG. 10 is a block diagram of the car navigation apparatus 4. The car navigation apparatus 4 reserves a work area in a RAM 42 in accordance with data recorded in a ROM 41, and uses a CPU 43 to execute the car navigation software. At this time, the car navigation apparatus 4 uses an I/F to drive the liquid crystal display panel 33, whereby a display screen is formed. The car navigation apparatus 4 accesses a CD-ROM loaded into a CD-ROM drive 45, and loads, for example, map information, etc. The car navigation apparatus 4 uses an I/F 46 to access an IC card 3, and uses an I/F 47 to detect the type of operation using the operating devices 34. Based on present positional information obtained by a global positioning system (GPS) 48, the car navigation apparatus 4 displays guidance in accordance with a route recorded in the IC card 3.

In other words, when the user operates a predetermined operating device among the operating devices 34, the car navigation apparatus 4 accesses the CD-ROM drive 45 in accordance with navigation data recorded in the IC card 3, and loads map information corresponding to a route registered in the IC card 3. The car navigation apparatus 4 displays, on the liquid crystal display panel 33, a map based on the map information, and the route registered on the map. The car navigation apparatus 4 provides, based on the present positional information obtained by the GPS 48, guidance in accordance with the route. Accordingly, the car navigation apparatus 4 guides the user in accordance with a fully studied route.

The car navigation apparatus 4 displays a still picture recorded in the IC card 3 in accordance with operation using the operating devices 34. At this time, as described with reference to FIG. 8, in accordance with correlation information among files assigned to management data, the car navigation apparatus 4 displays each still picture that was captured at a spot just before the display and that was recorded in the IC card 3, based on positional information concerning the still picture. The car navigation apparatus 4 displays each still picture captured at the spot recorded in the IC card 3 when a route is selected beforehand. Therefore, in the car navigation apparatus 4, its operability is enhanced by effectively using the positional information of each still picture and correlation information among the files.

Figure 11:
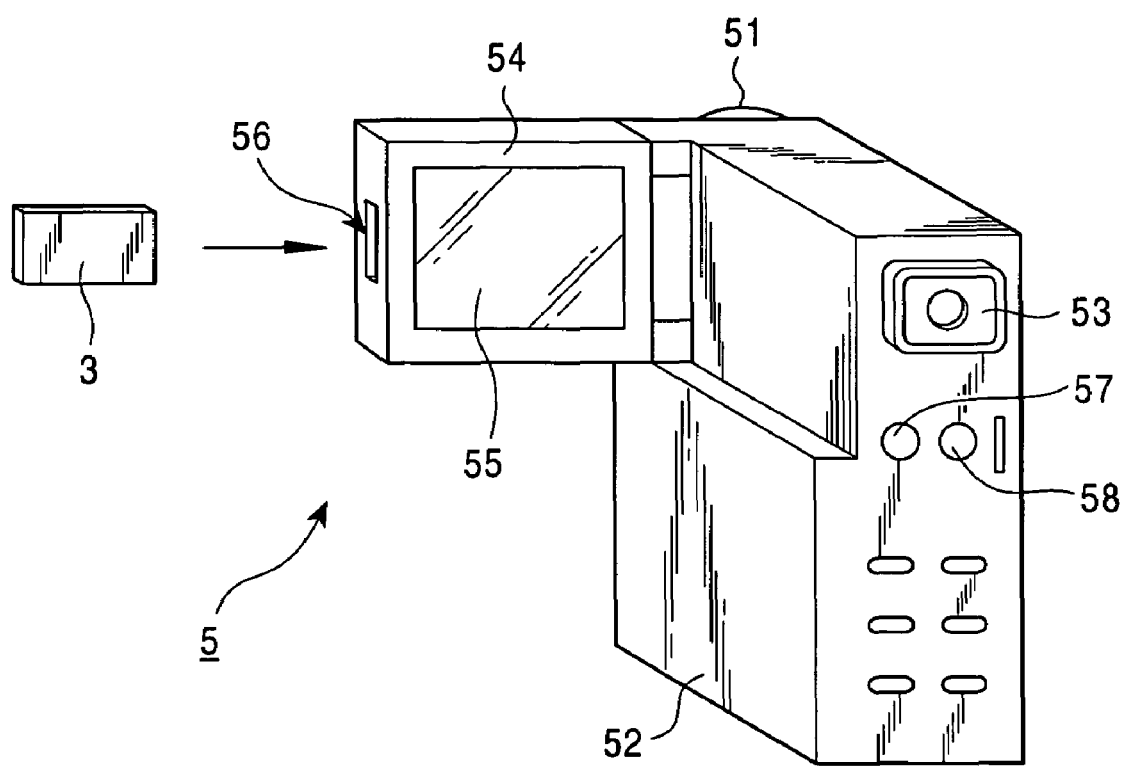
FIG. 11 is a perspective view showing the video camera shown in FIG. 2.

FIG. 11 is a perspective back view of the video camera 5. The video camera 5 uses a lens 51 provided on its front to capture the image of the desired subject, and is controlled to record moving pictures on a videotape. The video camera 5 records still pictures in the IC card 3.

The video camera 5 has a rectangular shape, and a video unit 52 as a videocassette recorder in its lower part. The lens 51 is provided on the upper front of the video camera 5, and an electronic viewfinder 53 is provided opposing the lens 51. The video camera 5 includes a side cover 54 that can be opened. On the inner surface of the side cover 54, a liquid crystal display panel 55 is provided. On a side of the side cover 54, a slot 56 into which the IC card 3 is inserted is formed.

A side of the video camera 5, opposed to the side cover 54 when it is closed, and the back of the video unit 52, have various operating devices. Under the electronic viewfinder 53, an operating device 57 for recording moving pictures, and an operating device 58 for recording still pictures, are provided.

Figure 1:
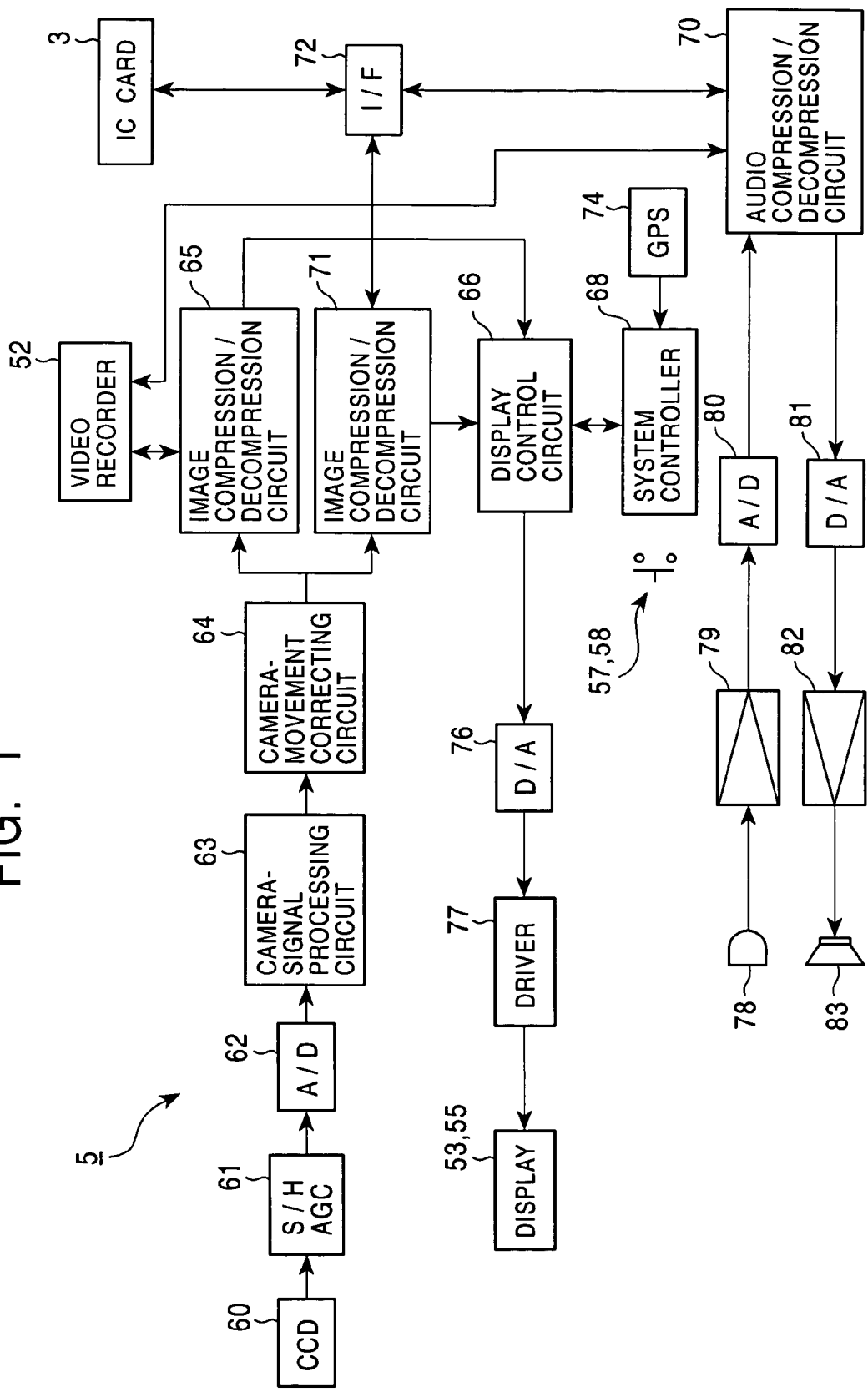
FIG. 1 is a block diagram showing a video camera according to an embodiment of the present invention.

FIG. 1 is a block diagram of the video camera 5. In the video camera 5, a charge-coupled device (CCD) unit 60 uses a lens unit (not shown) to form an optical image on a light-receiving surface, and outputs a captured picture. A sample-and-hold (S/H) automatic-gain-control (AGC) circuit 61 generates and outputs red, blue, and green color signals by performing correlative double sampling on the captured picture, and subsequently correcting the signal level. An analog-to-digital conversion circuit (hereinafter referred to as an "A/D") 62 converts the red, blue, and green color signals from analog form into digital form, and outputs red, blue, and green digital color signals. A camera-signal processing circuit 63 generates and outputs a luminance signal and color-difference signals in digital form by executing correction on the digital color signals, such as gamma correction, and processing the corrected signals by using matrix operations. A camera-movement correcting circuit 64 processes the digital luminance and color-difference signals output from the camera-signal processing circuit 63 by using camera movement correction and electronic zoom processing, and outputs the processed signals.

In modes excluding a reproduction mode, an image compression/decompression circuit 65 outputs, to a display control circuit 66, the luminance and color-difference signals output from the camera-movement correction circuit 64. In a moving-picture recording mode, and a moving-picture and still-picture recording mode, the image compression/decompression circuit 65 performs, in accordance with operation using the operating devices 57, data compression on the luminance and color-difference signals output from the camera-movement correcting circuit, and outputs the obtained video data to a video recorder 52.

In a moving-picture reproduction mode, the image compression/decompression circuit 65 decompresses the video data output from the video recorder 52, and outputs the decompressed data to the display control circuit 66. The image compression/decompression circuit 65 uses the moving picture experts group (MPEG) standard to compress the luminance and color-difference signals.

Under the control of a system controller 68, the video recorder 52 records, on a videotape, the video data output from the image compression/decompression circuit 65 and audio data output from an audio compression/decompression circuit 70. Conversely, the video recorder 52 reproduces video data and audio data recorded on the videotape, and outputs the reproduced data to the image compression/decompression circuit 65 and the audio compression/decompression circuit 70. Accordingly, the video camera 5 records and reproduces a captured moving picture.

In the still-picture recording mode, and the moving-picture and still-picture recording mode, an image compression/decompression circuit 71 performs data compression on the luminance and color-difference signals output from the camera-movement correcting circuit 64 in accordance with operation using the operating devices 58, and outputs the obtained video data to an I/F 72. In the still-picture reproduction mode, the image compression/decompression circuit 71 conversely decompresses video data output from the I/F 72, and outputs the decompressed data to the display control circuit 66. The image compression/decompression circuit 71 uses the joint photographic coding experts group (JPEG) standard to compress the luminance and color-difference signals.

The I/F 72 monitors the terminal voltage of a connector to which the IC card 3 is connected, and determines, based on a change in the terminal voltage, whether the IC card 3 is connected. When the I/F 72 detects the IC card 3, it accesses the IC card 3 in order to determine whether the IC card is correctly loaded. If the IC card 3 is correctly loaded, a light-emitting diode (not shown) glows. Under the control of the system controller 68, the I/F 72 accesses the IC card 3, and records the video data output from the image compression/decompression circuit 70 and the audio data output from the audio compression/decompression circuit 71, or outputs the recorded video data to the image compression/decompression circuit 71 and the recorded audio data to the audio compression/decompression circuit 70. In the above-described construction, the video camera 5 records captured still pictures on the IC card 3, together with audio signals, and also recognizes the recorded contents. In the case where the contents in the IC card 3 are updated, the I/F 72 is controlled by the system controller 68 to update management data. At this time, the I/F 72 records positional information of an image-capturing place which is obtained from a GPS 74 and information of correlation with car navigation data, in addition to a file type, etc., as the management data. This enables the video camera 5 to simply process the information recorded in the IC card 3 by using the car navigation apparatus 4 and the personal computer 2.

While the I/F 72 is accessing the IC card 3, as described above, it causes the light-emitting diode to flash, which prevents the user from mistakenly unloading the IC card 3.

The display control circuit 66 superimpose operation information of the video camera 5 on the luminance and color-difference signals output from the image compression/decompression circuit 65 or 71, and outputs the superimposed signals by performing data communication with the system controller 68.

A digital-to-analog conversion circuit (hereinafter referred to as a "D/A") 76 converts, from digital form into analog form, the luminance and color-difference signals output from the display control circuit 66, and outputs analog luminance and color-difference signals. A driver 77 uses the analog luminance and color-difference signals to drive an electronic viewfinder 53 and a liquid crystal display panel 55. Accordingly, in the video camera 5, captured pictures and reproduced pictures can be recognized, and entire operation information can be visually recognized.

A microphone 78 collects sound from a subject, and outputs audio signals based on the sound. An amplifier circuit 79 amplifies the audio signals output from the microphone at a predetermined gain, and outputs the amplified audio signals. An analog-to-digital conversion circuit (hereinafter referred to as an "A/D") 80 converts, from analog form into digital form, audio signals output from the amplifier circuit 79. In the recording mode, the audio compression/decompression circuit 70 compresses and outputs the audio signals to the video recorder 52 and the I/F 72. In the reproduction mode, the audio compression/decompression circuit 70 conversely decompresses audio data output from the I/F 72. The audio compression/decompression circuit 70 performs data compression by using adaptive transform acoustic coding to divide the audio signals into bands, and performing spectrum conversion.

A D/A 81 converts, from digital form into analog form, audio signals output from the audio compression/decompression circuit 70. The amplifier circuit 82 amplifies the audio signals, and outputs the amplified signals from a speaker 83. Accordingly, in the video camera 5, sound can be recorded, together with captured pictures, or recorded sound can be listened to.

The GPS 74 detects and outputs positional information of the video camera 5. The system controller 68 comprises a microcomputer, and controls the entire video camera 5 in accordance with operation using the operating devices 57 and 58. The GPS 74 also outputs operation information to the display control circuit 66 as required.

In other words, in the case where the system controller 68 is set to be in a normal operation mode by the user, the system controller 68 detects the loading of the IC card 3, and switches the operation mode from the moving-picture recording mode to the still-picture recording mode. Thereby, the system controller 68 records a still picture in the IC card 3 in accordance with the operation of operating device 58, instead of using the video recorder 52 to record a moving picture in accordance with the operation of the operating device 57.

In the case where the moving-picture and still-picture recording mode is set by the user, the system controller 68 uses the video recorder 52 to record a moving picture in accordance with the operation of the operating device 57, and records a still picture in the IC card 3 in accordance with the operation of the operating device 58. Thereby, the system controller 68 can simultaneously record a moving picture and a still picture in parallel.

As described above, when the still picture is recorded, the system controller 68 records, as information of an image capturing place, positional information acquired by the GPS 74. In the case where the management information recorded in the IC card 3 shows that there is a still picture recorded at almost the same image capturing place, the system controller 68 records correlation showing that this still picture is relevant to the still picture file of the image capturing place. Based on traveling date data assigned to car navigation, the system controller 68 determines whether the correlation data is relevant to car navigation data. If the correlation data is relevant to car navigation data (i.e., in the case of a date and time for traveling on a route based on the car navigation data), the system controller 68 records the still picture so as to be correlated with the file of the car navigation data.

Therefore, the video camera 5 enables the car navigation apparatus 4 and the personal computer 2 to simply process still pictures.

OPERATION OF EMBODIMENT

In the above-described car navigation system 1 (shown in FIG. 2), by setting, in the personal computer 2, for example, a travel schedule, a destination, a rest-stop place on the way, etc., a route connecting the positions, and the route and the travel schedule are recorded as navigation data in the IC card 3, as shown in FIGS. 6 and 7.

Accordingly, by loading the IC card 3 into the car navigation apparatus 4, as shown in FIGS. 9 and 10, the user can be guided along the preset route. When a commemorative picture is captured at the rest-stop place in the middle of traveling, the IC card 3 loaded into the car navigation apparatus 4 is unloaded and loaded into the video camera 5, as shown in FIGS. 1 and 10.

In the case where the video camera 5 is set to be in a normal operation mode, the I/F 72 detects the loading of the IC card 3, and the system controller 68 switches the operation mode of the video camera 5 from the moving-picture recording mode to the still-picture recording mode. In this mode, the desired subject is recognized by the electronic viewfinder 53 and the liquid crystal display panel 55, and video data of a still picture are recorded in the IC card 3 by operating the operating device 58. Accordingly, a still picture can be recorded instead of a moving picture by performing a simplified operation of loading the IC card 3 without providing change-over switches, which can enhance the operability of the video camera 5.

In the case where the moving-picture and still-picture recording mode is set, the video camera 5 can record a momentary scene in the IC card 3 while recording a moving picture on the videotape.

When a still picture is recorded in the IC card 3, as described above, the video camera 5 detects positional information of the present point by means of the GPS 74, and records the detected positional information as image-capturing-place data in the management data of each still picture file. This makes it possible to simply record image-capturing-place information.

Based on the date and time of image capturing, the video camera 5 determines whether the captured data are relevant to the car navigation data recorded in the IC card 3. If the video camera 5 has determined that the captured data are relevant, it records correlation showing that the captured data are relevant to the file of the car navigation data. Based on the positional information acquired by the GPS 74, in a plurality of still pictures recorded in almost the same image-capturing place, correlation among the pictures can be recorded.

In the case where the IC card 3 in which still pictures are recorded is loaded into the car navigation apparatus 4, the car navigation apparatus 4 displays each captured still picture on the liquid crystal display panel 33 in accordance with operation using the operating devices 34, as shown in FIGS. 9 and 10. At this time, for each still picture, in accordance with positional information of the image capturing place recorded in the management data, car navigation data, and correlation with other still pictures, the number of still pictures captured in each image capturing place can be displayed on a map, as shown in FIG. 9. By operating the operating device 34 that designated the displaying manner, for example, successive slide displaying can be performed.

In this embodiment, the still pictures can be enjoyed by effectively using the positional information recorded together with the still pictures. By linking the still pictures with the car navigation data, the still pictures can be understandably displayed. This makes it possible to effectively use positional information on each still picture in connection with the car navigation apparatus 4.

In the case where the IC card 3 in which the captured still pictures are recorded is later loaded into the personal computer 2, as shown in FIGS. 3 to 5, the image processing software in the personal computer 2 is used to similarly recognize the still pictures. At this time, for each still picture, in accordance with positional information of the image capturing place recorded in the management data, car navigation data, and correlation with other still pictures, the number of still pictures captured in each image capturing place can be displayed on a map, as shown in FIG. 9. By operating the keyboard that designated the displaying manner, for example, successive slide displaying can be performed.

Concerning the personal computer 2, by folding, on the keyboard, the tablet 13 opened in the front, the I/F 27 detects the folding of the keyboard, and enables the keyboard to be operable. By using the stylus 15 to drag a number M of captured pictures, as shown in FIG. 8, still pictures for each image-capturing place are displayed on a multiscreen. Therefore, by performing simplified operations, the still pictures can be enjoyed or arranged, and operability can be enhanced by effectively using information of each image-capturing place recorded together with the still pictures.

Although the entire size of the personal computer 2 is reduced for convenience of portability, it can be increased by folding the tablet 13, and the operability can be enhanced by an increase in size.

EFFECTS OF EMBODIMENT

According to the above-described construction, by simply loading the IC card 3 into the video camera 5 so that the moving-picture recording mode is switched to the still-picture recording mode, the operation mode of the video camera 5 can be securely switched.

OTHER EMBODIMENTS

In the above-described embodiment, the case where the present invention is applied to a video camera that records moving pictures on a videotape as a magnetic tape has been described. However, the present invention is not limited to the above-described embodiment, but may be applied to various image capturing apparatuses that record moving pictures on recording media such as optical disks.

What is claimed is:
1. An image capturing apparatus comprising:
control means for switching the mode of said image capturing apparatus between a first operation mode for recording an image-capturing signal as a still picture and a second operation mode for recording the signal as a moving picture; and detection means for detecting the loading of a first recording medium;

wherein said control means automatically switches the operation mode of said image capturing apparatus to said first operation mode when said detection means detects that said first recording medium is loaded into said image processing apparatus.

2. An image capturing apparatus comprising:

control means for switching the mode of said image capturing apparatus between a first operation mode for recording an image-capturing signal as a still picture on a card recording medium and a second operation mode for recording the signal as a moving picture on a tape recording medium; and detection means for determining whether said card recording medium is loaded into said image processing apparatus;

wherein said control means automatically switches the operation mode of said image capturing apparatus to said first operation mode, when said detection means detects that said card recording medium is loaded into said image processing apparatus.

3. An image capturing apparatus comprising:

first operation means for recording an image-capturing signal on a card recording medium in accordance with a first recording mode;

second operation means for recording the signal on a tape recording medium in accordance with a second recording mode;

detection means for determining whether said card recording medium is loaded into said image capturing apparatus;

wherein said control means causes said first recording mode of said image capturing apparatus to be automatically set when said detection means detects that said card recording medium is loaded into said image processing apparatus.

* * * * *